(12) United States Patent
Reed

(10) Patent No.: US 10,357,859 B1
(45) Date of Patent: Jul. 23, 2019

(54) CLAMPING SYSTEM FOR SECURING A WORK PIECE TO A FIXTURE

(71) Applicant: Daniel J Reed, Pleasant Plain, OH (US)

(72) Inventor: Daniel J Reed, Pleasant Plain, OH (US)

( * ) Notice: Subject to any disclaimer, the term of this patent is extended or adjusted under 35 U.S.C. 154(b) by 344 days.

(21) Appl. No.: 14/199,333

(22) Filed: Mar. 6, 2014

(51) Int. Cl.
*B23Q 3/06* (2006.01)

(52) U.S. Cl.
CPC ..................... *B23Q 3/06* (2013.01)

(58) Field of Classification Search
USPC .......... 29/281.1; 269/32, 137, 138, 210, 282
See application file for complete search history.

(56) References Cited

U.S. PATENT DOCUMENTS

| | | | |
|---|---|---|---|
| 1,938,337 A | 12/1933 | Janiszewski | |
| 2,987,972 A | 6/1961 | Schneider | |
| 3,512,794 A | 5/1970 | Lohman | |
| 3,595,112 A | 7/1971 | De George | |
| 3,970,296 A | 7/1976 | Rameson | |
| 4,049,253 A | 9/1977 | Mandel | |
| 4,406,445 A | 9/1983 | Seidel | |
| 4,451,026 A | 5/1984 | Oope | |
| 4,489,927 A * | 12/1984 | Yamada | B23Q 3/102 269/137 |
| 4,577,847 A | 3/1986 | Schedwin | |
| 4,640,501 A | 2/1987 | Poland | |
| 4,736,935 A * | 4/1988 | Vasapolli | B25B 1/08 269/137 |
| 4,787,614 A | 11/1988 | Givens | |
| 4,796,900 A | 1/1989 | Gant et al. | |
| 4,948,309 A | 8/1990 | Newland et al. | |
| 5,149,070 A * | 9/1992 | Dykstra | B25B 5/08 269/137 |
| 5,174,554 A | 12/1992 | Yonezawa | |
| 5,181,701 A | 1/1993 | Yonezawa | |
| 5,244,193 A | 9/1993 | Hehr | |
| 5,370,378 A | 12/1994 | Weber et al. | |
| 5,454,148 A | 10/1995 | Ewer et al. | |
| 5,542,654 A | 8/1996 | Johanson | |
| 5,690,546 A | 11/1997 | Mascola | |
| 5,718,420 A * | 2/1998 | Bernstein | B25B 5/08 269/138 |
| 5,718,422 A | 2/1998 | Morghen | |
| 5,964,458 A | 10/1999 | Cutsforth et al. | |
| 6,039,312 A | 3/2000 | Morghen | |
| 6,158,728 A | 12/2000 | Smith | |

(Continued)

*Primary Examiner* — Joseph J Hail
*Assistant Examiner* — Shantese L McDonald
(74) *Attorney, Agent, or Firm* — Mark F. Smith; Smith Brandenburg Ltd

(57) ABSTRACT

The present invention is directed to a clamping system for supporting a work piece in position for receiving a machining operation and more particularly to a clamping system for supporting a work piece for receiving a machining operation whereby the work piece is held in position by exerting pressure against two or more locations along the surface of the work piece and that the supporting force at least one location is directed against the work piece in at least two vectors. In a preferred embodiment of the invention, the clamping system of the subject invention is effective for supporting more than one work pieces in position for receiving a manufacturing operation.

8 Claims, 11 Drawing Sheets

(56) References Cited

U.S. PATENT DOCUMENTS

| | | | |
|---|---|---|---|
| 6,202,996 | B1 | 3/2001 | Cutsforth et al. |
| 6,238,766 | B1 * | 5/2001 | Massett .................. E02D 31/02 |
| | | | 405/270 |
| 6,244,589 | B1 | 6/2001 | Durfee, Jr. |
| 6,378,877 | B1 | 4/2002 | Luscher et al. |
| 6,422,931 | B1 | 7/2002 | Laflamme |
| 6,598,867 | B2 | 6/2003 | Martinez |
| 6,619,641 | B2 | 9/2003 | Heitzmann et al. |
| 6,659,439 | B1 * | 12/2003 | Baumgartner ............ B25B 1/12 |
| | | | 269/137 |
| 6,930,272 | B1 | 8/2005 | Limano |
| 7,243,407 | B2 | 7/2007 | Daris |
| 7,367,552 | B2 | 5/2008 | Greber |
| 7,478,577 | B1 | 1/2009 | Wheeler |
| 7,886,455 | B1 | 2/2011 | Stojkovic |
| 7,914,729 | B2 | 3/2011 | Boersma |
| 7,922,159 | B2 | 4/2011 | Troxler |
| 7,963,527 | B2 | 6/2011 | Weller |
| 8,087,675 | B2 | 1/2012 | Korson |
| 8,087,858 | B2 | 1/2012 | Martin |
| 8,113,497 | B2 | 2/2012 | Kellerson |
| 8,167,316 | B2 | 5/2012 | Egger |
| 8,177,210 | B2 | 5/2012 | Kitamura et al. |
| 8,201,601 | B2 | 6/2012 | Van Valkenburg |
| 8,210,777 | B2 | 7/2012 | Ishida |
| 8,214,985 | B2 | 7/2012 | Kitamura |
| 2011/0135409 | A1 | 6/2011 | Hayashizaki et al. |
| 2011/0309561 | A1 | 12/2011 | Hofmann |

* cited by examiner

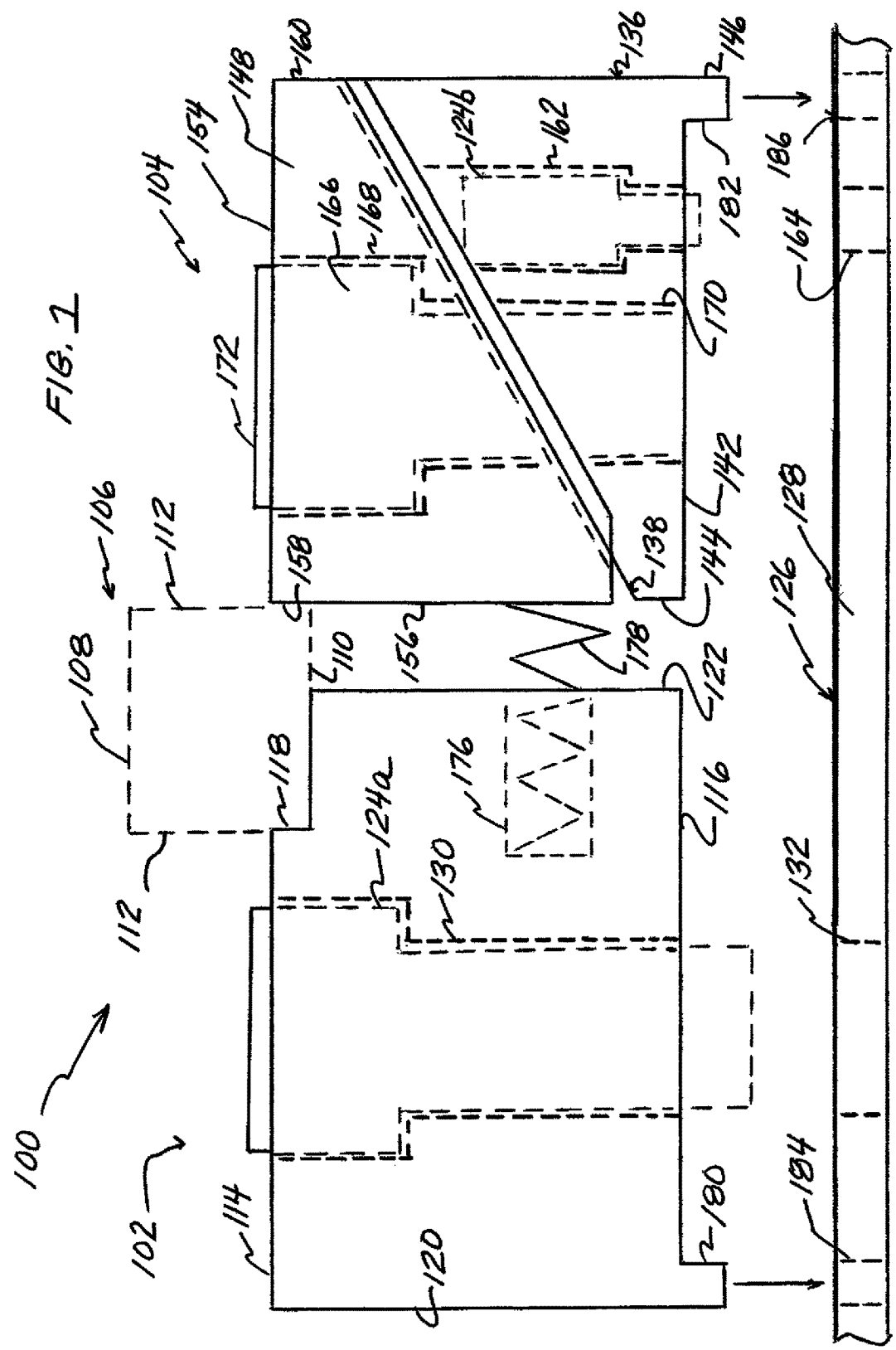

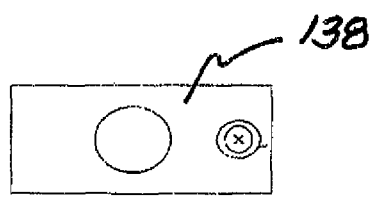
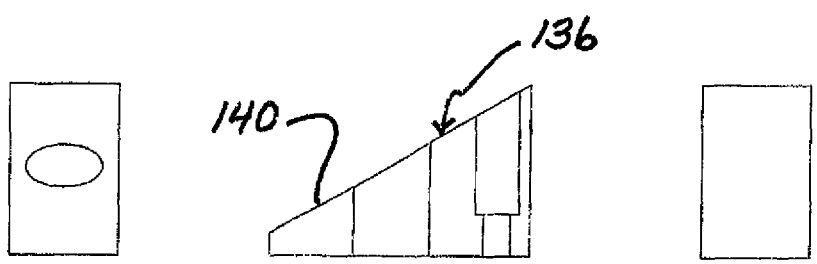
FIG. 5
FIG. 3  FIG. 2  FIG. 4

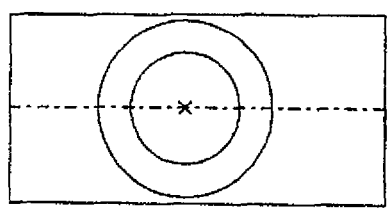
FIG. 8
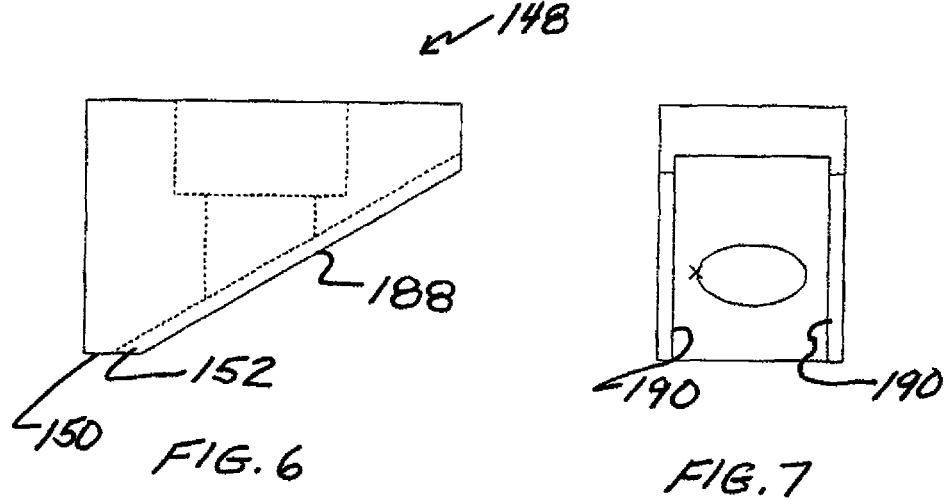
FIG. 6
FIG. 7

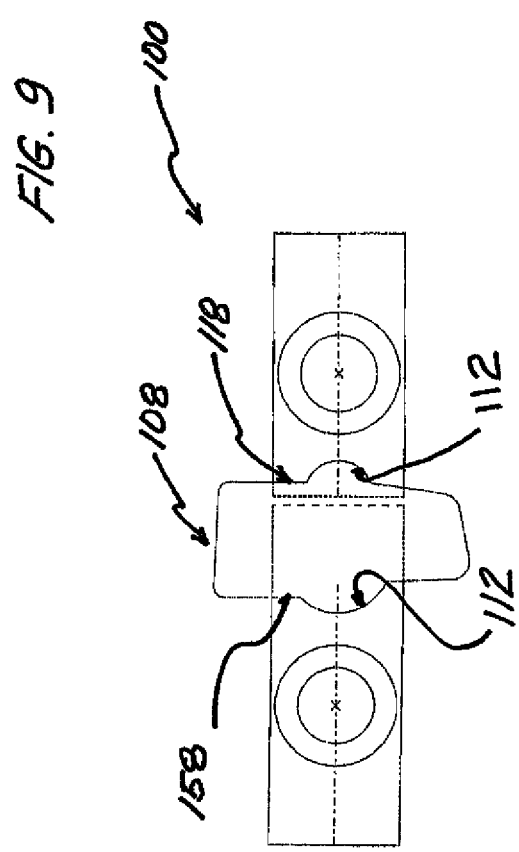

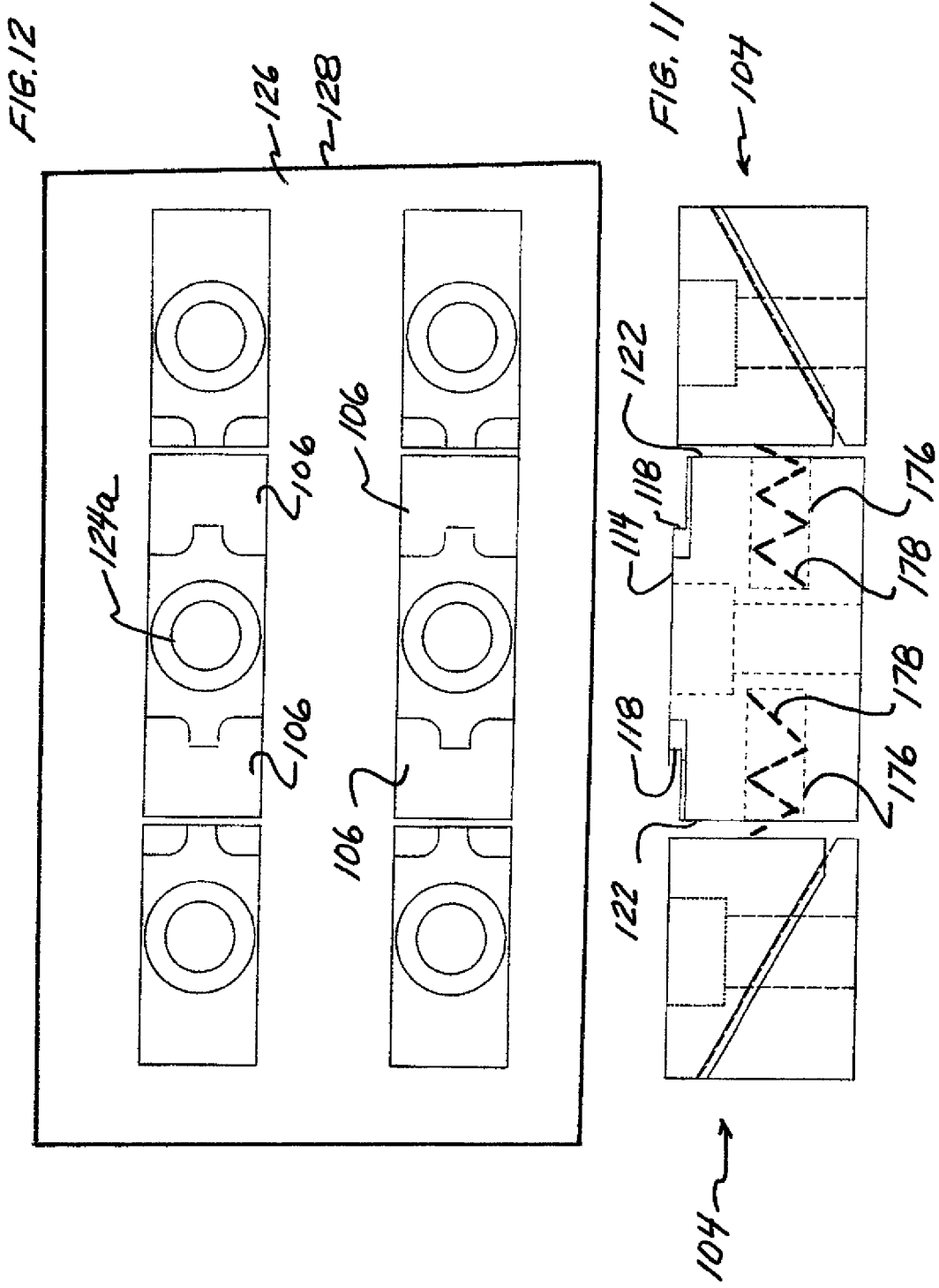

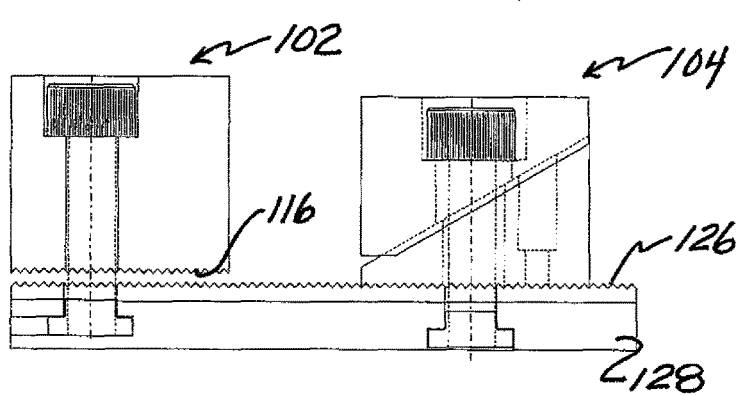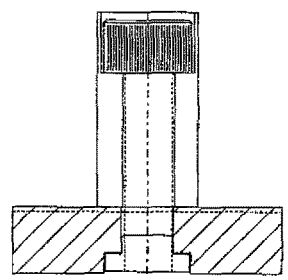
FIG. 14a  FIG. 14b
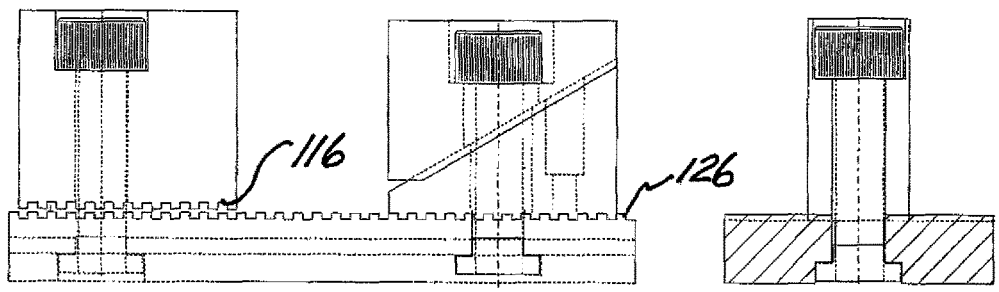
FIG. 15a  FIG. 15b

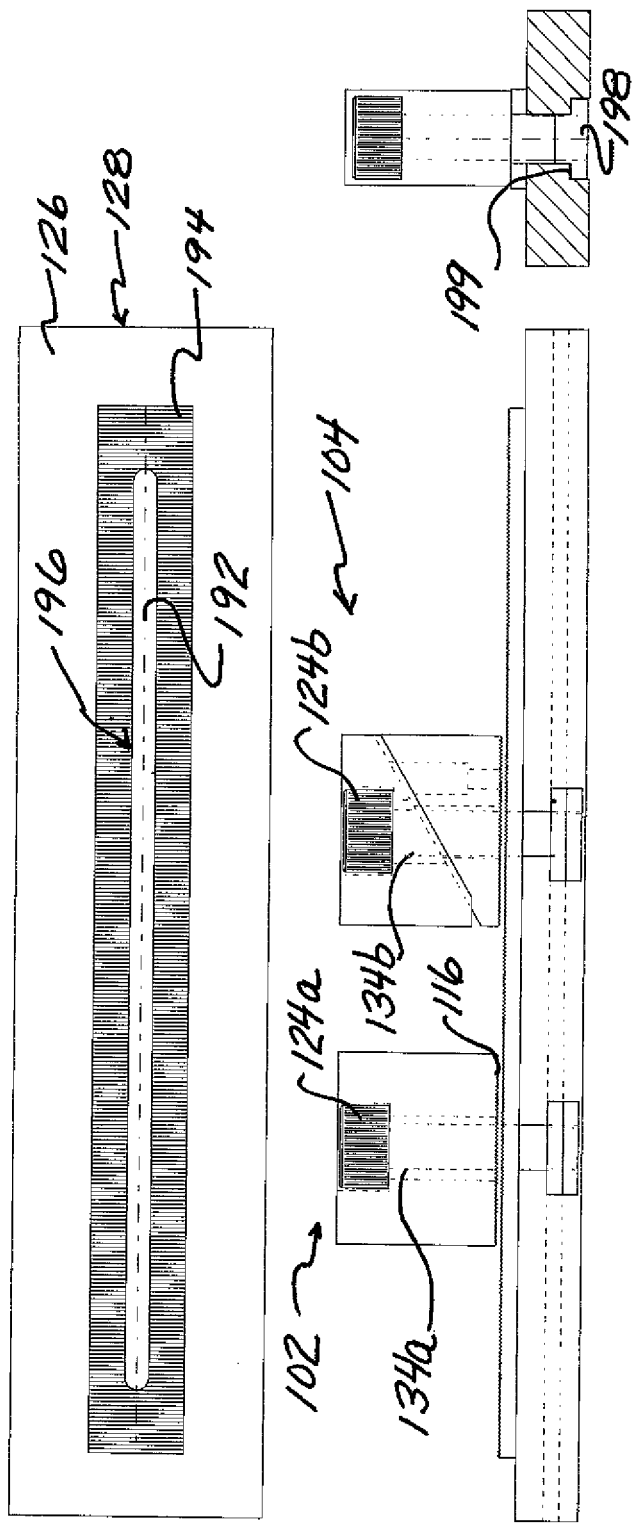

CLAMPING SYSTEM FOR SECURING A WORK PIECE TO A FIXTURE

BACKGROUND OF THE INVENTION

The subject invention is directed to a clamping system for securing a work piece in position on a fixture during a machining operation and more particularly, to a clamping system effective for providing securing forces against two or more surfaces of a work piece such that the work piece is secured in place on a fixture.

Machine operations such as cutting and drilling often require clamps to be utilized for gripping one or more edges of the work piece to secure the work piece on a fixture for processing. In many processing operations relatively large vertical, lateral and torquing forces act on the work piece and the clamps must be of sufficient strength to prevent the work piece from being dislodged and expelled from the fixture. In many applications the work piece to be processed is relatively thin and/or narrow providing little surface area for engaging the clamp. Accordingly, the clamp is often required to secure the work piece by exerting pressure against relatively narrow portions of the work piece in such a manner to secure the work piece in position on the fixture.

In many operations, a large number or work pieces need to be machined. Often, such as for computer controlled machining operations, such as CNC systems, it is desirable to provide fixtures that can have a plurality of work pieces clamped thereon thus allowing for a significant decrease in the overall time of machining. Unfortunately, many prior art clamping systems require relatively large amounts of time to clamp and unclamp the work pieces thereby significantly increasing the time and expense of the machining operation.

In order to reduce the time and expense of machining, systems have been designed whereby tools are dedicated to work with a specific work piece or a family of work pieces in an effort to reduce machining time. This often requires systems that insure the proper placement of the work piece on an existing fixture. Accordingly, it is desirable to have a clamping system that can be easily modified to adapt to clamp work pieces having various dimensions as well as contours.

In the use of horizontal and vertical computer numeric controlled machines it is desirable to place larger sized work pieces onto a fixture. Accordingly, various systems for holding work pieces in proper position for machining have been developed. One such method developed is by use of a machining vice. Such vices typically operate to maintain pressure in an axis parallel to the base of the vise. While generally versatile, the vices are often large and are generally not usable for machining work pieces needing tight tolerances. Further, such systems often require the machine operator to closely examine the work piece to ensure that the vice did not rise at the point of contact when securing a relatively small work piece having a small point of contact.

Accordingly, a need exist for a clamping system for securing a work piece to a fixture for a machining operation, that can be used for clamping relatively small work pieces or larger sized work pieces, that can be used for work pieces having a relatively small amount of contact work surface, that requires a relatively small amount of time to clamp and unclamp a work piece, is relatively inexpensive to manufacture, can be used to clamp one or more work pieces in position, and ensures proper placement and maintains such placement of the work piece on a fixture during the machining operation.

SUMMARY OF THE INVENTION

The subject invention is a clamping system effective for securing a work piece in position on a fixture for having a machining process performed thereon. In a preferred embodiment of the invention, the clamping system comprises a first clamping component having a device for securing the first clamping component to a fixture; and a second clamping component having a device for securing the second clamping component to the fixture, the second clamping component having a lower securing block with a first inclined planer portion, and a sliding block having a second inclined planar portion for engaging and moving along the first inclined planar portion and a fastening device for fastening the sliding block to the lower securing block and effective for moving the sliding block such that the second inclined planar portion moves along the first inclined planar portion wherein the sliding block contacts and presses against the work piece.

In another preferred embodiment of the invention, the first clamping component and the second clamping component operate together to provide frictional contact to the work piece to secure the work piece in position during processing.

In another preferred embodiment of the invention, the first clamping component and the second clamping component operate together to provide equal and opposite forces against the surface of the work piece to secure the work piece in position during processing.

In another preferred embodiment of the invention, the clamping system provides a force to prevent the work piece from being dislodged or expelled from the clamping system during processing.

In another preferred embodiment of the invention, the first clamping component includes a threaded aperture for receiving a threaded fixture bolt for securing the first clamping component in a desired position on the fixture and the second clamping component includes a threaded aperture for receiving a threaded fixture bolt for securing the second clamping component in a desired position on the fixture.

In another preferred embodiment of the invention, the first clamping component includes at least one protrusion that engages the fixture to effectively ensure the first clamping component is in proper alignment on the fixture.

In another preferred embodiment of the invention, the second clamping component includes at least one protrusion that engages the fixture to effectively ensure the second clamping component is in proper alignment on the fixture.

In another preferred embodiment of the invention, the clamping system includes at least one spring effective for aiding the separation of the first clamping component from the second clamping component during removal of the work piece from the clamping system.

In another preferred embodiment of the invention, the sliding block includes a skirt for preventing or reducing dirt, debris, or machining chips from being deposited along the surfaces of the inclined planar portions of the lower securing block and the upper sliding block.

In another preferred embodiment of the invention, the clamping surface of the first clamping component and the clamping surface of the second clamping component are geometrically shaped clamping surfaces.

In another preferred embodiment of the invention, the clamping surface of the first clamping component and the clamping surface of the second clamping component are machined to have a contour mirroring the contour of the attachment surface of the work piece.

In another preferred embodiment of the invention, the clamping system comprises a first clamping component and one or more second clamping components for securing more than one work piece in position on a fixture.

In another preferred embodiment of the invention, the clamping system comprises more than one first clamping component and more than one second clamping system effective for operating together to secure a relatively large work piece in position on fixture.

In another preferred embodiment of the invention, the first clamping component and the second clamping component each including a clamping surface effective for mating with the attachment surface of the fixture to support the clamping system in position along the fixture.

In another preferred embodiment of the invention, the first clamping component and the second clamping component each include a securing device that cooperate with a slut positioned along the attachment surface of the fixture that operate to easily position the first clamping component and the second clamping component along the attachment surface of the fixture and to easily clamp the components in position for anchoring a work piece in position for machining.

Another preferred embodiment of the invention is a method for clamping a work piece in position on a fixture for receiving a machining process using a clamping system, the method comprising the steps of securing a first clamping component in a desired position on a fixture, securing a second clamping component having a securing block with a first aperture and a first inclined planar portion in a desired position on the fixture, placing a sliding block having a second aperture and a second inclined planar portion in position on the second clamping component such that the first inclined planar portion is adjacent to the second inclined planar portion and wherein the first aperture is longitudinally aligned with the second aperture, placing a work piece in position such that the first clamping component and the second clamping component are in contact with the work piece, and inserting a fastener into the first aperture and the second aperture, and rotating the fastener to advance the sliding block to exert a force against the work piece by the first clamping component sufficiently to ensure that the work piece remains in position and securely anchored to prevent movement during the machining operation.

In another preferred embodiment of the invention the supporting force being exerted against the work piece by the clamping system is directed in at least two vectors.

In another preferred embodiment of the invention the method includes the step of using more than one clamping system for securing more than one work piece in position on the fixture.

In another preferred embodiment of the invention, the first clamping component and the second clamping component each include a clamping surface for contacting and pressing against the work piece.

In another preferred embodiment of the invention the method includes the step of contouring each clamping surface to align with the gripping surface of the work piece.

BRIEF DESCRIPTION OF THE DRAWINGS

The forgoing and other features of the invention will be best understood with reference to the following detailed description of a specific embodiment of the invention when read in conjunction with the accompanying drawings, wherein:

FIG. 1 is a side schematic illustration showing the clamping system of the subject invention (not attached to the fixture) having a first clamping component and a second clamping component having a lower securing block with an upper inclined planar portion and a sliding block having a lower inclined planar portion such that the upper inclined planar portion is adjacent to the lower inclined planar portion, and having clamping surfaces for engaging and anchoring a work piece in position for receiving a machining process;

FIG. 2 is a side schematic illustration of the lower securing block of the clamping system of FIG. 1;

FIG. 3 is a forward side schematic illustration of the lower securing block of the clamping system of FIG. 1;

FIG. 4 is a rearward side schematic illustration of the lower securing block of the clamping system of FIG. 1;

FIG. 5 is a top schematic illustration of the lower securing block of the clamping system of FIG. 1;

FIG. 6 is a side schematic illustration of the sliding block of the clamping system of FIG. 1;

FIG. 7 is a forward side schematic illustration of the sliding block of the clamping system of FIG. 1;

FIG. 8 is a top schematic illustration of the sliding block of the clamping system of FIG. 1;

FIG. 9 is a top schematic illustration of the clamping system of FIG. 1 showing a work piece anchored to the attachment surface of a fixture by the clamping system of the subject invention;

FIG. 11 is another preferred embodiment of the clamping system of the subject invention showing a first clamping component and a pair of second clamping components effective for securing two work pieces in position on a fixture;

FIG. 12 is a top schematic illustration of the clamping system of FIG. 10 and further showing more than one such clamping system for securing a plurality of work pieces in position on a fixture;

FIG. 14a is a side schematic illustration of another preferred embodiment of the clamping system showing a first clamping component and a second clamping component each having a geometrically shaped clamping surface for mating with a corresponding geometrically shaped clamping surface along the attachment surface of a fixture for providing support for maintaining the clamping system in position on the fixture;

FIG. 14b is an end schematic illustration of the clamping system of FIG. 14a;

FIG. 15a is a side schematic illustration showing another embodiment of the geometrically shaped clamping surfaces for mating with a corresponding geometrically shaped clamping surface along the attachment surface of a fixture for providing support and maintaining the clamping system in position on the fixture;

FIG. 16b is an end schematic illustration of the clamping system of FIG. 15a;

FIG. 16 is a top schematic illustration showing the attachment surface of the fixture having an elongated slot for receiving one or more securing devices for securing one or more first clamping components and one or more second clamping components in position on the fixture;

FIG. 17a is a side schematic illustration showing the attachment surface of FIG. 16 having a first clamping component and a second clamping component secured in position on the fixture;

FIG. 17b is an end schematic illustration if the attachment surface of FIG. 16;

DETAILED DESCRIPTION OF THE INVENTION

Figure 10:
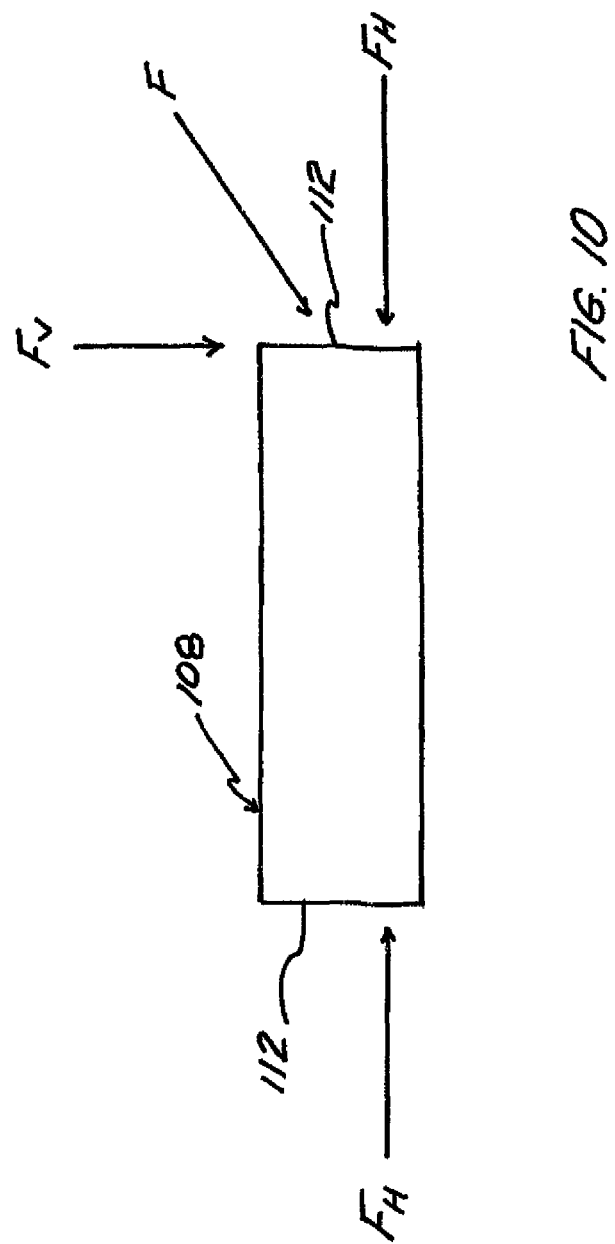
FIG. 10 is a schematic illustration of a portion of the clamping system of FIG. 1 showing the force vectors being applied by the first clamping component and the sliding block of the second clamping component against the surface of the work piece.

The present invention is directed to a clamping system for supporting a work piece in position for receiving a machining operation and more particularly to a clamping system for supporting a work piece for receiving a machining operation whereby the work piece is held in position by exerting pressure against two or more locations along the surface of the work piece and that the supporting force at least one location is directed against the work piece in at least two vectors. In a preferred embodiment, the clamping system is relatively easy to attach in position along a clamping or attachment surface on a fixture. Further, in a preferred embodiment of the invention, the clamping system of the subject invention is effective for supporting more than one work piece in position on a fixture. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein, the terms "advancing" means moving in a direction substantially towards the work piece and the term "retreating" means moving in a direction substantially away from the work piece. The terms "upward" and "upwardly" refers to a direction away from the attachment surface of the fixture and the terms "downward" and "downwardly" refers to a direction towards the attachment surface of the fixture. The term "horizontal" refers to the direction parallel to the attachment surface of the fixture and the term "vertical" refers to the direction perpendicular to the attachment surface of the fixture. As used herein, the terms "substantially perpendicular" or "generally perpendicular" refers to an angle that is less than about 45 degrees from perpendicular, and more preferably less than about 15 degrees from perpendicular.

Referring to FIGS. 1-9, a preferred embodiment of the clamping system 100 of the subject invention is shown comprising a first clamping component 102 and a second clamping component 104 for securing and anchoring a work piece 106 in position on a fixture 128 for receiving a machining operation. FIG. 1 shows a general representation of a preferred embodiment of the clamping system 100 with a work piece 106 anchored thereto. The work piece 106 includes a top surface 108, a bottom surface 110, and side surfaces 112 and can be formed from metal, wood, plastic or any other material upon which manual or machine operations may be performed and having sufficient strength for receiving a machining operation performed thereon. It should also be understood that the work piece 106 can be in the form of various sizes, thicknesses, and shapes and that the clamping system 100 can be sized to accommodate the various sized work pieces. The first and second clamping components 102 and 104, respectively, are formed from steel or another similar metal but it should be understood that other materials effective for securing a work piece in position on a fixture and ensuring it is anchored in position during the machining operation.

In a preferred embodiment of the invention the first clamping component 102 includes an upper face 114, a lower face 116, a clamping surface 118, an outer side face 120, and inner side face 122, and a first securing device 124a for securing the first clamping component 102 to an attachment surface 126 of a fixture 128. Preferably, the first clamping component 102 comprises a threaded aperture 130 extending through and substantially perpendicular to the upper face 114 for receiving the first securing device 124a, such as a threaded bolt. The threaded aperture 130 longitudinally aligns with a threaded aperture 132 or other opening through the attachment surface 126 of the fixture 128 for receiving the first securing device 124a, as shown, which is effective for securing the first clamping component 102 to the fixture 128. It should be understood that the first securing device 124a can also be a cap screw or other like means effective for securing the first clamping component 102 to the fixture 128. As shown, in a preferred embodiment the threaded aperture 130 for receiving the first securing device 124a and the threaded aperture or opening 132 in the attachment surface 126 are positioned so that they longitudinally align and orientated such that the first securing device 124a, such as a threaded fixture bolt, is substantially perpendicular to the upper face 114 of the first clamping component 102 and the attachment surface 126 of the fixture 128. Such perpendicular alignment, rather than an inclined orientation of the securing device 124a, permits easy insertion and removal of the securing device 124a, such as a threaded bolt, by an operator as well as reducing the costs typically associated with providing inclined threaded bores.

The second clamping component 104 comprises a lower securing block 136 having an upper surface 138 with an upper inclined planar portion 140, a lower face 142, an inner face 144, and an outer face 146; and an upper sliding block 148 having a lower surface 150 with a lower inclined planar portion 152, an upper inner face 154, an inner face 156 having a clamping surface 158, and an outer face 160. The lower securing block 136 includes a threaded aperture 162 for aligning with a threaded aperture or opening 164 on the attachment surface 126 of the fixture 128 for receiving a second securing device 124b, such as a threaded fixture bolt, to secure the lower securing block 136 to the fixture 128. It should be understood that the second securing device 124b can also be a cap screw or other like means effective for securing the lower securing block 136 to the fixture 126. As shown, in a preferred embodiment the threaded aperture 162 in the lower securing block 136 and threaded aperture or opening 164 in the fixture 128 are positioned so that they are longitudinally aligned and orientated such that the securing device 124b, such as a threaded fixture bolt, is substantially perpendicular to the lower face 142 of the lower securing block 136 and attachment surface 126 of the fixture 128 to permit easy insertion and removal of the securing device 124b, such as a threaded fixture bolt, as well as reducing the cost of manufacturing typically associated with aperture and bolt assemblies that are not generally perpendicular to the seating face of an assembly.

The upper sliding block 148 is positioned and operates such that the lower inclined planar portion 152 of the upper sliding block 148 is slidably disposed upon the upper inclined planar portion 140 of the lower securing block 136 and held in a fixed position by a tightening device 166. Preferably, the tightening device 166 includes a first threaded aperture 168 extending substantially perpendicularly from the upper sliding block face 154 through the upper sliding block 148 and the lower inclined planar portion 152 for receiving a tightener 172, such as a threaded bolt. A second threaded aperture 170 extends from the upper inclined planar portion 140 of the lower securing block 136. The first threaded aperture 168 of the upper sliding block 148 and the second threaded aperture 170 of the lower securing block 136 longitudinally align for receiving the tightener 172, such as a threaded bolt. As shown the first threaded aperture 168 and the second threaded aperture 170 are each positioned and orientated such that the tightener 172 is substantially perpendicular to the upper sliding block surface 154 such that when the tightener 172 is tightened the lower inclined planar portion 152 is driven along the upper inclined planar portion 140 to advance the upper sliding block 148 into contact with and in pressing engagement with the work piece 106. The upper sliding block 148 upon contacting the work piece 106 along clamping surface 158 operates to push the work piece 106 against the clamping surface 118 of the first clamping component 102 and exerts both horizontal and vertical forces on the work piece 106 and cooperates with clamping surface 118 of the first clamping component 102 to secure and anchor the work piece 106 in position for receiving a machining operation.

Referring to FIGS. 1 and 10, a portion of the clamping system of the subject application is shown illustrating in more detail the force vectors 174 being applied by the first clamping component 102 and the upper sliding block 148 of the second clamping component 104 against the side surfaces 112 of the work piece 108. As shown, the force F being applied against one side surface 112 of the work piece 108 by the first clamping component 102 is shown by the horizontal force vector Fh. The force being applied against the surface 112 of the work piece 108 by the upper sliding block 148 of the second clamping component 104 against the other side surface 112 of the work piece 106 includes a horizontal force vector Fh and a vertical force vector Fv. Thus, advancement of the upper sliding block 148 towards the work piece 108 cooperates with the first clamping component 102 to provide frictional contact with the work piece 108 as well as providing equal and opposite horizontal forces as well as at least one downward force against the work piece 106 to anchor the work piece 106 in position on the fixture 128 for receiving a machining operation as well as helping to ensure that the work piece 108 is not lifted out of position during the machining operation or resulting in the work piece 108 being dislodged and ejected from the clamping system 100 during the machining operation.

In a preferred embodiment of the invention, the inner side face 122 of the first clamping component 102 includes a bore 176 having a spring 178, such as a coil spring, seated within the bore 176 and extending longitudinally outwardly therefrom. When the clamping system 100 is engaged and anchoring a work piece 106 in position on the fixture 128 for receiving a machining operation, the spring 178 contacts the inner face 156 of the upper sliding block 148 to bias or apply pressure to aide in retracting the lower inclined planar portion 152 along the upper inclined planar portion 140 when the tightener 172, such as a threaded bolt, is loosened and/or removed from the threaded bore 168.

In another preferred embodiment of the invention, the first clamping component 102 and the second clamping component 104 are provided with a protrusion 180 and 182, respectively. As shown, protrusion 180 extends substantially perpendicularly from the lower face 116 of the first clamping component 102 and is effective for mating with a first aperture or opening 184 in the attachment surface 126 of fixture 128. Protrusion 182 extends substantially perpendicular from the lower face 142 of the second clamping component 104 and is effective for mating with a second aperture or opening 186 in the attachment surface 126 of the fixture 128. In operation, when the protrusions 180, 182 are each properly nested within respective apertures or openings 184, 186 in the fixture 128, they operate to ensure that the first clamping component 102 and the second clamping component 104 are properly seated along the attachment surface 126 of the fixture and prevents or minimizes any movement of the clamping system 100 during the machining of the work piece 106.

In another preferred embodiment of the invention, as shown in FIGS. 1, 6 and 7, the upper sliding block 148 includes a pair of skirts 188 longitudinally extending along the outer edges 190 of the lower inclined planar portion 152. As shown, the upper sliding block 148 is sized such that the skirts 188 run along and cover the edges 190 of the upper inclined planar portion 140 of the lower securing block 136. During machining of the work piece 106, the skirts 188 operate to cover the upper inclined planar portion 140 and prevent or reduce the possibility of dirt, debris, or machined chips from being deposited on the upper inclined planar portion 140 which could reduce the amount of force that can be applied against the work piece 106 by the clamping system 100 or skew the direction of the force being applied.

Referring to FIGS. 1 and 9, another preferred embodiment of the invention is shown whereby the side surfaces 112 of the work piece 106 have a non-linear contour. As shown, clamping surface 118 of the first clamping component 102 and the clamping surface 158 of the second clamping component 104 each have a contour that mirrors the corresponding contoured side surfaces 112 of the work piece 106. Preferably, the surfaces 118 and 158 are precision machined so that the clamping surfaces of the clamping system and the portion of the side surfaces 112 used for mounting the work piece 108 precisely align thereby preventing or reducing the likelihood that the work piece may shift out of position during the machining operation.

In another preferred embodiment of the invention, as shown in FIGS. 1, 11 and 12, the clamping system 100 comprises a first clamping component 102 modified to cooperate with a pair of second clamping components 104 for securing and anchoring respective work pieces 106 in position for receiving a machining operation. It should now be understood that such an arrangement allows multiple work pieces to be positioned on a fixture while reducing the number of clamping systems, thereby reducing the cost and increasing the number of work pieces to be processed before removal.

As shown, the first clamping component 102 includes clamping surfaces 118, inner side faces 122, and a securing device 124*a* for securing the first clamping component 102 to an attaching surface 126 of a fixture 128. Preferably, the first clamping component 102 comprises a threaded aperture 130 extending through and substantially perpendicular to the upper face 114 of the first clamping component 102 and longitudinally aligns with a threaded aperture 132 (such as shown in FIG. 1) or other opening through the attachment surface 128 of the fixture 128 for receiving a securing device 124*a*, such as a threaded bolt, effective for securing the first clamping component 102 to the fixture 128. It should be understood that the securing device 124a but can also be a cap screw or other like means effective for securing the first clamping component 102 to the fixture 128. As shown, in a preferred embodiment the threaded aperture 130 and the threaded aperture or opening 132 are positioned so that they longitudinally align and orientated such that the securing device 124a is substantially perpendicular to the upper face 116 of the first clamping component 102 and the attachment surface 126 of the fixture 128. Such perpendicular alignment, rather than an inclined orientation, of the securing device 124a permits easy insertion and removal of the securing device 124a by an operator as well as reducing the costs typically associated with providing inclined threaded bores.

As previously described and shown for FIGS. 1-8, each second clamping component 104 comprises a lower securing block 136 having an upper surface 138 with an upper inclined planar portion 140, a lower securing block face 142, an inner face 144 and an outer face 146; and an upper sliding block 148 having a lower surface 150 with a lower inclined planar portion 152, an upper face 164, an inner face 156 having a clamping surface 158, and an outer face 160. The lower securing block 136 includes a threaded aperture 162 for aligning with a threaded aperture or opening 164 on the attachment surface 126 of the fixture 128 for receiving a second securing device 124b, such as a threaded bolt, to secure the lower securing block 138 to the fixture 128. It should be understood that the securing device 124b can also be a cap screw or other like means effective for securing the lower securing block 136 to the fixture 128. As shown, in a preferred embodiment the threaded aperture 162 in the lower securing block 138 and threaded aperture or opening 164 in the fixture 128 are positioned so that they are longitudinally aligned and orientated such that the securing device 124b is substantially perpendicular to the lower face 142 of the securing block surface 138 and attaching surface 126 of the fixture 128 to permit easy insertion and removal of the securing device 124b as well as reducing the cost of manufacturing typically associated with aperture and bolt assemblies that are not generally perpendicular to the seating face of an assembly.

The upper sliding block 148 is positioned and operates such that the lower inclined planar portion 152 of the upper sliding block 148 is slidably disposed upon the upper inclined planar portion 140 of the lower securing block 136. The second clamping component 104 further includes a tightening device 166 comprising a first threaded aperture 168 extending substantially perpendicularly from the upper face 154 of the sliding block 148 and through the upper sliding block 148 and the lower inclined planar portion 152. A second threaded aperture 170 extends from the upper inclined planar portion 140 of the lower securing block 136. The first threaded aperture 168 of the upper sliding block 148 and the second threaded aperture 170 of the lower securing block 136 longitudinally align for receiving a tightener 172, such as a threaded bolt. As shown for each second clamping component 104, the first threaded aperture 168 and the second threaded aperture 170 are positioned and orientated such that the tightener 172 is substantially perpendicular to the upper face 154 of the sliding block 148 such that when the tightener 172 is tightened, the lower inclined planar portion 152 is driven to advance along the upper inclined planar portion 140 such that the upper sliding block 148 contacts and presses against the work piece 106. The sliding block 148 upon contacting the work piece 106 along clamping surface 158 operates to push the work piece 106 against the clamping surface 118 of the first clamping component 102 and exerts both horizontal and vertical force vectors on the work piece 106 and cooperates with clamping surface 118 of the first clamping component 102 to secure and anchor the work piece 106 in position for receiving a machining operation. In a preferred embodiment of the invention, the inner side faces 122 of the first clamping component 102 each include a bore 176 having a spring 178, such as a coil spring, seated within the bore 176 and extending longitudinally outwardly therefrom. When the clamping system is engaged and anchoring a work piece 106 in position for receiving a machining operation, the respective spring 178 contacts the respective inner faces 156 of the upper sliding block 148 and biases or applies pressure to aide in retracting the lower inclined planar portion 152 along the upper inclined planar portion 140 when the tightener 172 is loosened and/or removed. It should now be apparent that the preferred embodiment of the clamping system 100 allows the single first clamping component 102 to cooperate with the pair of second clamping components 104 for securing at least two work pieces 106 in position.

Figure 13:
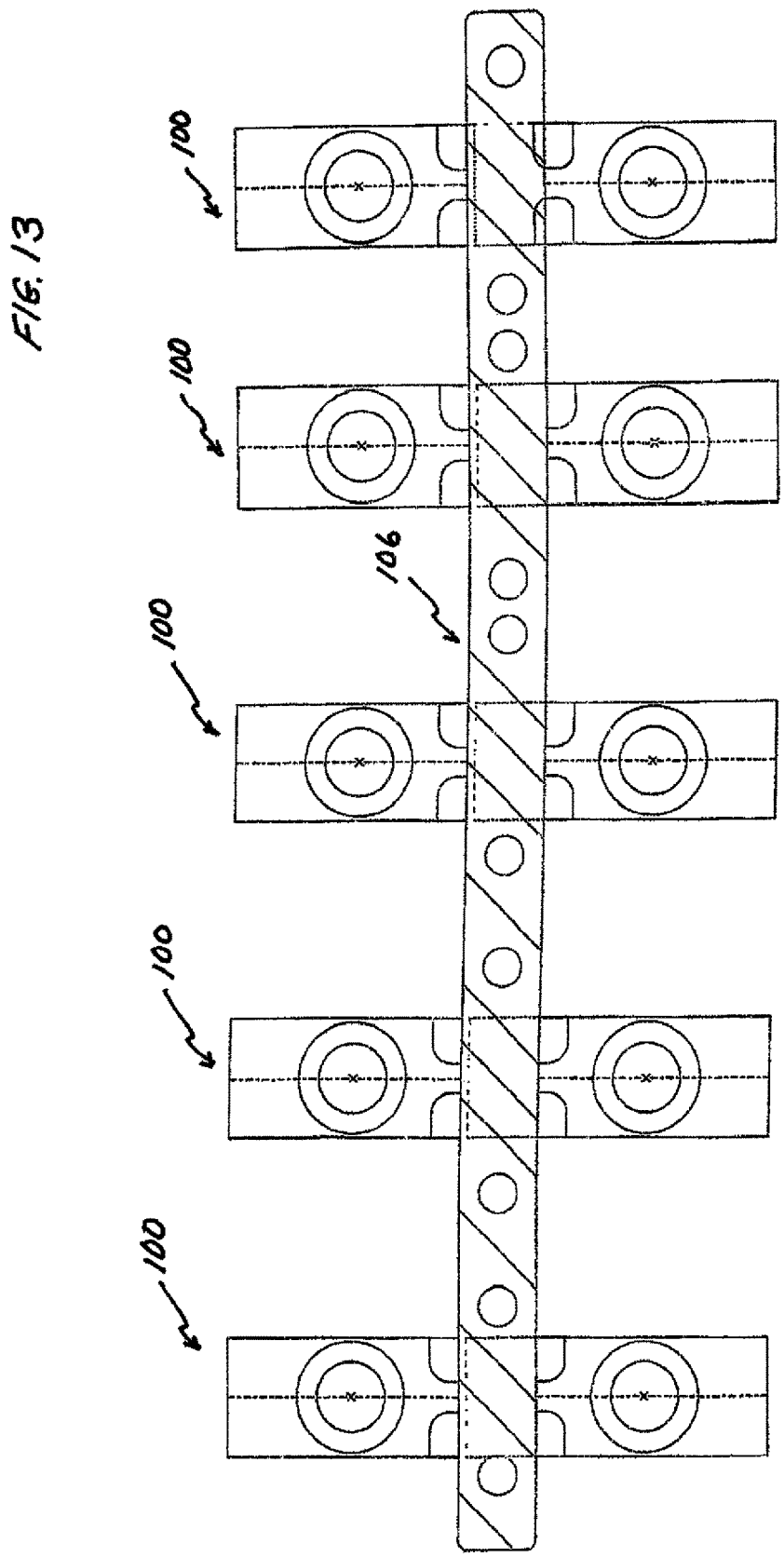
FIG. 13 is a top schematic illustration of the clamping system of FIG. 1 showing a plurality of clamping systems cooperating together to secure an elongated work piece in position on a fixture.

Referring to FIG. 13 a plurality of clamping systems 100 as previously described above, are shown cooperating together to secure an elongated work piece 106 in position on a fixture 128 (FIG. 1). Each clamping system 100 comprises a first clamping component and a second clamping component as previously described having clamping surfaces for pressing against the various surfaces of the work piece 106 and securing it in position. It should now be apparent to one skilled in the art that various work pieces having different dimensions can be positioned and anchored to a fixture using one or multiple numbers of clamping systems. Further, it should also now be apparent that various combinations of first clamping components and second clamping components can be utilized in different arrangements and combinations to secure in position and anchor different dimensionally sized, number, and configured work piece(s) to a fixture. It should also now be understood that the clamping systems can be dimensionally modified or constructed to allow for larger or smaller work pieces to be properly secured in position and anchored to a fixture.

Referring to FIGS. 14a, 14b and 15a, 15b, another preferred embodiment of the clamping system 100 is shown whereby the lower face 116 of the first clamping component 102 and the lower face 142 of the second clamping component 104 are geometrically shaped for mating with a corresponding geometrically shaped attachment surface 126 of a fixture 128 for providing support for maintaining the clamping system 100 and work piece 106 in position during machining. As shown in FIGS. 14a and 14b, the lower faces 116 and 142 are in the form of a coin edge shape that mate with a coin edge shaped attachment surface 126 of the fixture 128. Referring to FIGS. 15a and 16b, anther configuration is shown whereby the lower faces 116 and 142 are in the form of a square gear shape that mates with a gear shaped attachment surface 126 of the fixture 128. It should now be understood that the use of such geometrically shaped mating surfaces allows the operator to easy adjust the clamping system, such as moving the first clamping component and the second clamping component towards or away from each other to adjust for various sized work pieces while further increasing resistance to movement of the clamping system during a machining operation.

In another preferred embodiment, as illustrated in FIGS. 16, 17a and 17b, the attachment surface 126 of the fixture 128 includes an elongated T-shaped slot 192. In one preferred embodiment the attachment surface further includes a geometrically shaped portion 194 extending along the circumference 196 of the slot 192. In a preferred embodiment, the securing device 124a of the first clamping component 102 and the securing device 124b of the second clamping component 104 each include a threaded bolt 134a and 134b, respectively that extend into respective threaded anchor nuts 198 slidably positioned within slot 192. It should now be understood that once the first clamping component 102 and the second clamping component 104 are in position for securing a work piece 106, the threaded bolts 134a, 134b are screwed into their respective anchor nuts 198 thereby causing the anchor nuts 198 to press against the surface 199 of the T-shaped slot 192. As previously described, the lower face 116 of the first clamping component 102 and the lower face 142 of the second clamping component 104 are geometrically shaped for mating with a corresponding geometrically shaped portion 194 of the attachment surface 126 of a fixture 128 for providing support for maintaining the clamping system 100 and the one or more work pieces 106 in position during machining.

Figure 18A:
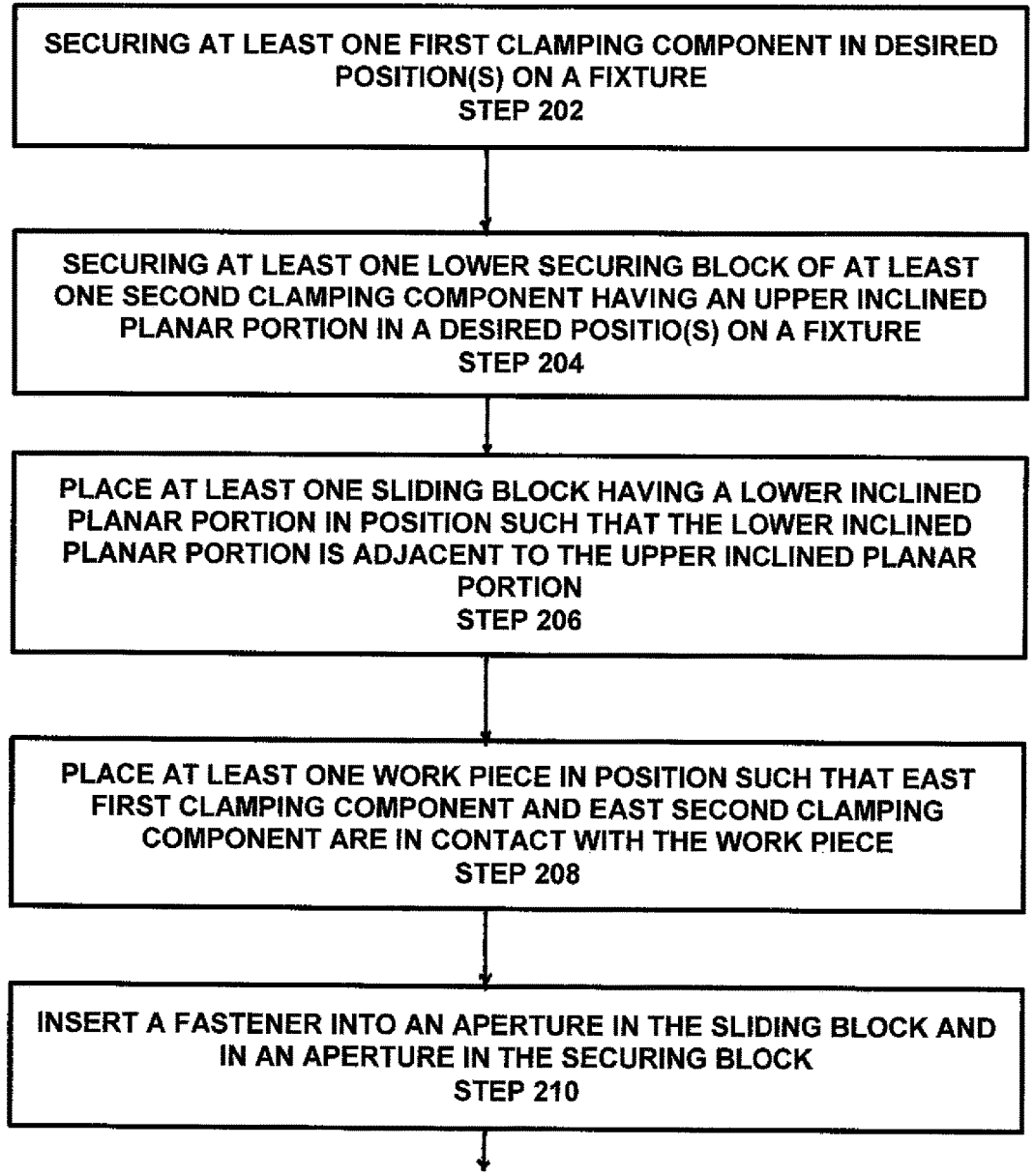
FIG. 18a is an illustration showing the methodology of using a clamping system for supporting at least one work piece in position on a fixture for receiving a machining operation.
Figure 18B:
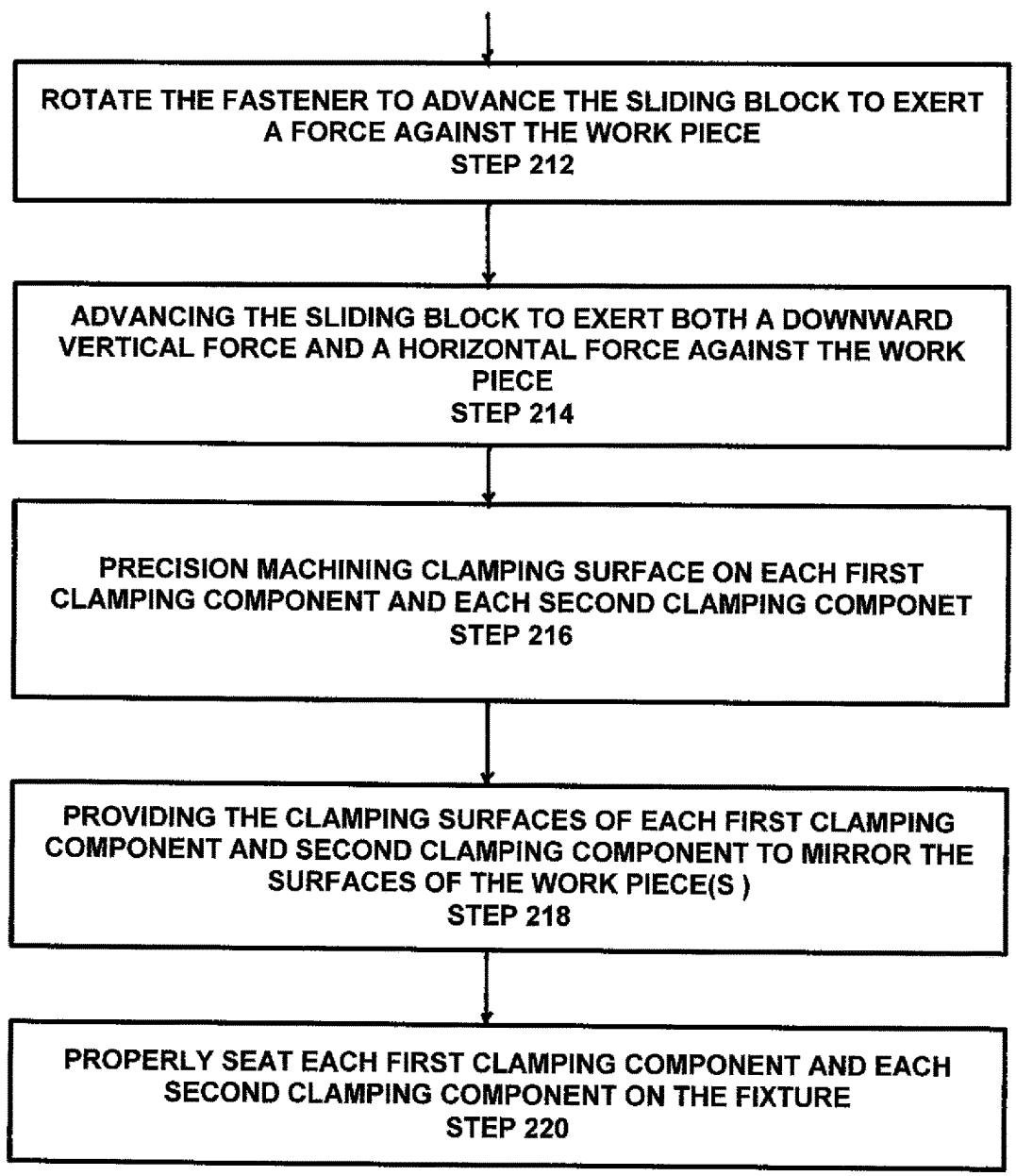
FIG. 18b is a continuation of the methodology shown in FIG. 18.

A preferred embodiment of the invention is a method for clamping at least one work piece in position on a fixture for receiving a machining process using a clamping system. As shown in FIGS. 18a and 18b the method comprises the steps of securing at least one first clamping component in a desired position(s) on a fixture (step 202), securing a lower securing block of at least one second clamping component having a first aperture and a upper inclined planar portion in a desired position(s) of the fixture (step 204), placing at least one sliding block having a second aperture and a second inclined planar portion in position on the respective second clamping component such that the first inclined planar portion is adjacent to the second inclined planar portion and wherein the first aperture is longitudinally aligned with the second aperture (step 206). Placing each work piece in position such that a first clamping component and a second clamping component are in contact with the work piece (step 208), and inserting a tightener into the first aperture and the second aperture (step 210), and rotating the tightener to advance the sliding block to exert force against the work piece by the first clamping component sufficiently to ensure that the work piece remains in position and securely anchored to prevent movement during the machining operation (step 212).

In another preferred embodiment of the invention, the method comprises moving the sliding block of the second clamping component such that it is advanced and makes contact with the work piece along the clamping surface of the sliding block and operates to push the work piece against the clamping surface of the first clamping component such that the clamping system exerts both a horizontal and a vertical force on the work piece (step 214).

In another preferred embodiment of the invention, the method comprises precision machining the clamping surfaces of the first clamping component and the second clamping component such that the clamping surfaces and the mounting surfaces of the work piece are precisely align thereby preventing or reducing the likelihood that the work piece may shift out of position during the machining operation (step 216).

In another preferred embodiment of the invention the method includes the step of machining the clamping surface of the first clamping component and the clamping surface of the second clamping component such that each are provided with a contour that mirrors the contoured side surfaces of the work piece (step 218).

In another preferred embodiment of the invention the method includes properly seating the clamping system on the surface of the fixture, wherein the first clamping component and the second clamping component each include a protrusion extending substantially perpendicularly from the first clamping component and the second clamping component and nested within respective apertures or openings on the fixture that operate to ensure that the first clamping component and the second clamping component are properly seated along the surface of the fixture and to prevent or minimize any movement of the clamping system during the machining of the work piece (step 220).

It should now be apparent that the system and method of the subject invention provides a clamping system that provides system for securing a workpiece to a fixture for a machining operation, that can be used for clamping relatively small work pieces or larger sized work pieces, that requires a relatively small amount of time to clamp and unclamp a work piece, is relatively inexpensive to manufacture, can be used to clamp one or more work pieces in position, and ensures proper placement and maintains such placement of the work piece during the machining operation. It should now be apparent to one skilled in the art that the clamping system of the subject application operates such that both generally horizontal and vertical force vectors can be applied to a work piece for anchoring the work piece, including a work piece having a relatively small surface area for use in clamping (relatively small surface area for the clamping surfaces of the clamping system to press against), in position and maintaining that position during a machining operation. It should also now be apparent to one skilled in the art that the clamping system of the subject application can utilize fixture bolts (or other similar devices) for attaching the clamping system to a fixture such that the fixture bolts are generally perpendicular to the attachment surface of the fixture to permit easy insertion and removal of the bolt as well as reducing the cost of manufacturing typically associated with apertures and bolt assemblies that are not generally perpendicular to the seating face of an assembly. It should also now be apparent to one skilled in the art that the clamping system and method of the subject invention allows an operator to increase or decrease the clamping force being applied against the surfaces of the work piece by simply rotating the tightener, such as a threaded tightening bolt, in the appropriate direction to increase or decrease the clamping force. As shown, the tightener, such as a tightening bolt, is generally perpendicular to the attachment surface of the fixture to permit easy insertion and tightening or loosening of the tightener as well as reducing the cost of manufacturing. It should also now be apparent to one skilled in the art that the clamping system of the subject invention may include more than one second clamping components that cooperate with a first clamping component to secure more than one work piece in position for machining. Further, it should now be apparent to one skilled in the art that the clamping system can be utilized with additional clamping systems to secure larger sized work pieces in position.

Although the present invention has been described in considerable detail with reference to certain preferred embodiments thereof, other embodiments are possible. Therefore, the scope of the appended claims should not be limited to the description of the preferred embodiments contained herein.

What is claimed is:

1. A clamping system for securing at least one work piece in position on a fixture for receiving a machining operation wherein the work piece having a planar bottom surface extending continuously between a first side surface and a second side surface and wherein the first side surface and the second side surface extend upwardly from the planar bottom surface, the clamping system consisting essentially of:
- a first clamping component having an upper face, a lower face, and a first clamping surface, wherein said upper face of said first clamping surface operates to contact a portion of the planar bottom surface of the work piece to provide a vertical support to the work piece during the machining operation, and at least one second clamping component having a second clamping surface;
- said second clamping component having a lower securing block with an upper surface with an inclined planar portion, a lower face, and an upper sliding block having an inner face, an upper face and a lower surface with a lower inclined planar portion;
- a threaded aperture extending through said upper face of said first clamping component that longitudinally aligns with an opening in an attachment surface of the fixture and having a securing device extending there through and perpendicular to the attachment surface of the fixture and effectively removably securing said first clamping component to the fixture;
- wherein said upper surface of said lower securing block includes a first threaded aperture extending there through and having a securing device extending through said first threaded aperture and into an opening in the fixture effectively removably securing the lower securing block to the fixture;
- wherein said inclined planar portion of said upper securing block is slidably disposed upon the inclined planar portion of said lower securing block and having a threaded aperture extending perpendicularly from the upper face of said sliding block through the upper sliding block and longitudinally aligns with a threaded aperture extending from the lower inclined planar portion of said lower securing block into said lower securing block and is effective for receiving a tightening device such that when the tightening device is tightened said inclined planar portion of said upper sliding block is driven along the upper inclined planar portion of said lower securing block such that the first clamping surface and said second clamping surface cooperate such that said first clamping surface presses against the first side surface of the work piece to exert a first horizontal force vector and said second clamping surface presses against the second side surface of the work piece to exert a second horizontal force vector such that the first horizontal force vector and said second horizontal force vector operate to anchor the work piece in position against said first clamping component and said second clamping component and such that the portion of the planar bottom surface of the work piece rests on said upper face of said first clamping component during a machining operation;
- wherein said first clamping component includes at least one spring positioned nested within said first clamping component that operates to contact said inner face of said upper sliding block and biasing or applying pressure to aide in retracting said upper sliding block along said upper inclined planar portion of said lower securing block when said tightening device is loosened and/or removed; and
- wherein said upper sliding block include skirts effective for preventing or reducing the amount of dirt, debris, or machined chips being deposited on said upper inclined planar portion of the second clamping component.

2. The clamping system of claim 1 wherein said first clamping component and said second clamping component each include a protrusion extending perpendicularly from said first clamping component and said second clamping component and nested within respective apertures or openings on the fixture that operate to ensure that said first clamping component and said second clamping component are properly seated along the surface of the fixture and effective for preventing or minimizing movement of said clamping system during the machining operation.

3. The clamping system of claim 1 wherein said first clamping surface has a contour that mirrors the first side surface if the work piece and said second clamping surface has a contour that mirrors the second side surface of the work piece.

4. The clamping system of claim 1 further comprising at least one spring that operates to contact said upper sliding block and biasing or applying pressure to aide in retracting said upper sliding block along said upper inclined planar portion of said lower securing block when said tightening device is loosened and/or removed.

5. The clamping system of claim 1 wherein the first clamping component cooperates with at least two second clamping components to anchor more than one work piece in position to a fixture.

6. The clamping system of claim 1 further comprising more than one second clamping component wherein each said clamping component cooperates with a first clamping component to anchor one or more work pieces in position for a manufacturing operation.

7. The clamping system of claim 1 wherein said lower face of said first clamping component and said lower face of said lower securing block are geometrically shaped for mating with a corresponding geometrically shaped attachment surface of the fixture.

8. The clamping system of claim 1 wherein said securing device of said first clamping component and said securing device of said second clamping component each include anchor nuts slidably positioned within an elongated slot positioned along the attachment surface of the fixture and which operate to press against the fixture to anchor the first clamping component and the second clamping component in position on the fixture.

* * * * *